(12) United States Patent
Pizzorno et al.

(10) Patent No.: US 7,995,886 B2
(45) Date of Patent: Aug. 9, 2011

(54) WATER-RESISTANT OPTICAL CABLE AND MANUFACTURING METHOD

(75) Inventors: Massimo Pizzorno, Milan (IT); Alessandro Ginocchio, Sesto San Giovanni (IT); Massimiliano Pavan, Verdello (IT); Davide Ceschiat, Milan (IT)

(73) Assignee: Prysmian Cavi E Sistemi Energia S.R.L., Milan (IT)

( * ) Notice: Subject to any disclaimer, the term of this patent is extended or adjusted under 35 U.S.C. 154(b) by 500 days.

(21) Appl. No.: 11/663,758

(22) PCT Filed: Sep. 27, 2004

(86) PCT No.: PCT/EP2004/010812
§ 371 (c)(1),
(2), (4) Date: Jul. 2, 2009

(87) PCT Pub. No.: WO2006/034723
PCT Pub. Date: Apr. 6, 2006

(65) Prior Publication Data
US 2009/0297106 A1   Dec. 3, 2009

(51) Int. Cl.
*G02B 6/44* (2006.01)
*G02B 6/10* (2006.01)
*G02B 6/02* (2006.01)
*B29C 47/02* (2006.01)
*H02G 15/00* (2006.01)

(52) U.S. Cl. ....... 385/109; 385/100; 264/1.28; 425/102; 427/163.2; 523/173

(58) Field of Classification Search ........... 385/100, 385/109, 110, 111, 112, 113, 141, 102, 103, 385/105, 143, 145; 523/173; 427/162, 163.2, 427/356, 358, 384, 385.5; 428/375; 525/194; 106/272; 522/42; 510/310, 338; 508/136; 264/1.28; 425/102
See application file for complete search history.

(56) References Cited

U.S. PATENT DOCUMENTS
4,612,155 A   9/1986   Wong et al. ............... 264/176 R
(Continued)

FOREIGN PATENT DOCUMENTS
DE   199 61 657   7/2001
(Continued)

OTHER PUBLICATIONS

International Standard IEC 60794-1-2, "IEC 60797-1-2 Ed 2.0: Optical Fibre Cables—Part 1-2: Generic specification—Basic optical cable test procedures," pp. 1-102.

(Continued)

*Primary Examiner* — Brian M Healy
(74) *Attorney, Agent, or Firm* — Finnegan, Henderson, Farabow, Garrett & Dunner, L.L.P.

(57) ABSTRACT

A method for manufacturing an optical cable for communication includes at least one micromodule, said micromodule being blocked with respect to the propagation of water. The method includes the steps of providing at least one optical fiber; embedding the at least one optical fiber in a pseudoplastic filling compound having a viscosity of 3 Pa·s to 30 Pa·s, preferably 7 Pa·s to 25 Pa·s at a shear rate of $10 \text{ s}^{-1}$ and at a temperature of 100° C., and a cross-over lower than 30 Hz, preferably 5 Hz to 25 Hz, at a temperature of 100° C.; and extruding a retaining element made of a thermoplastic polymeric composition around the at least one optical fiber so embedded in the filling compound to obtain a micromodule.

51 Claims, 2 Drawing Sheets

U.S. PATENT DOCUMENTS

| | | | | |
|---|---|---|---|---|
| 4,617,360 | A | 10/1986 | Bienfait | 526/114 |
| 4,644,044 | A | 2/1987 | Gloriod et al. | 526/272 |
| 4,645,298 | A | 2/1987 | Gartside, III | 385/100 X |
| 4,703,997 | A | 11/1987 | Ijiri et al. | 385/100 X |
| 4,767,182 | A | 8/1988 | Parfree et al. | 385/100 X |
| 4,798,853 | A | 1/1989 | Handlin, Jr. | 523/173 |
| 5,671,312 | A | 9/1997 | Jamet | 385/100 |
| 5,751,880 | A | 5/1998 | Gaillard | 385/109 |
| 5,911,023 | A | 6/1999 | Risch et al. | 385/100 |
| 6,160,939 | A | 12/2000 | Sheu | 385/109 |
| 6,278,824 | B1 | 8/2001 | Bosisio et al. | 385/100 |
| 6,937,802 | B2 | 8/2005 | Jamet et al. | 385/100 |
| 7,536,071 | B2 * | 5/2009 | Pavan et al. | 385/103 |
| 2002/0041744 | A1 | 4/2002 | Anelli et al. | 385/112 |
| 2003/0049002 | A1 | 3/2003 | Bosisio et al. | 385/109 |
| 2003/0168243 | A1 | 9/2003 | Jamet et al. | 174/113 R |
| 2008/0212927 | A1 * | 9/2008 | Pavan et al. | 385/103 |
| 2009/0297106 | A1 * | 12/2009 | Pizzorno et al. | 385/109 |

FOREIGN PATENT DOCUMENTS

| | | |
|---|---|---|
| EP | 0 182 530 | 5/1986 |
| EP | 0 377 314 | 7/1990 |
| EP | 0 398 604 | 11/1990 |
| EP | 0 957 383 | 11/1999 |
| EP | 1 426 804 | 6/2004 |
| GB | 2 091 745 | 8/1982 |
| WO | WO 93/05113 | 3/1993 |
| WO | WO 2004/034115 | 4/2004 |
| WO | WO 2004/059360 | 7/2004 |
| WO | WO 2006/034722 | 4/2006 |

OTHER PUBLICATIONS

H.A. Barnes et al., "An Introduction to Rheology," (1$^{st}$ Ed.-1989), pp. 16-25.

* cited by examiner

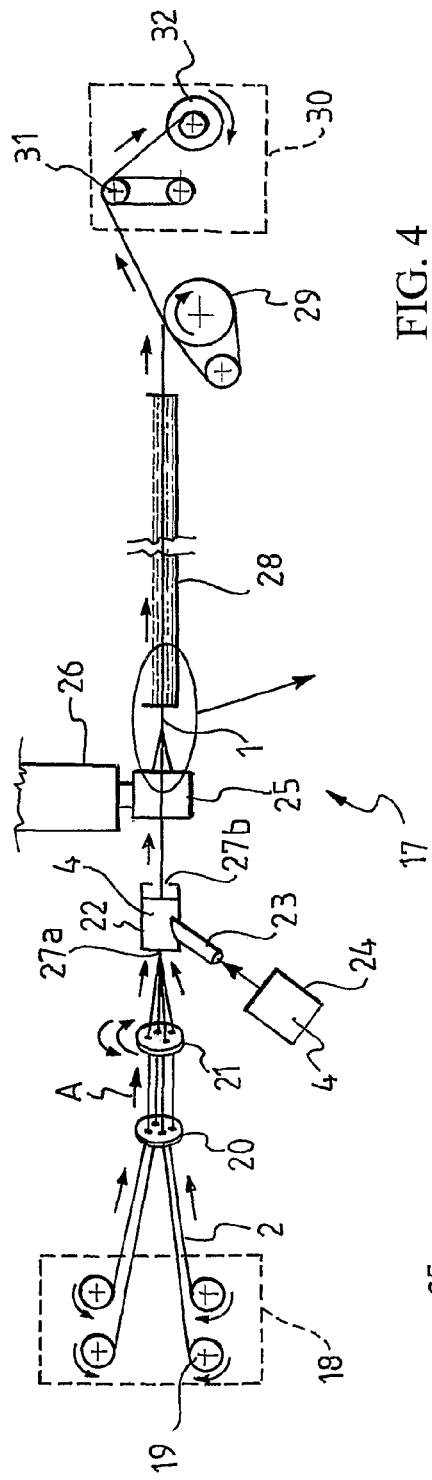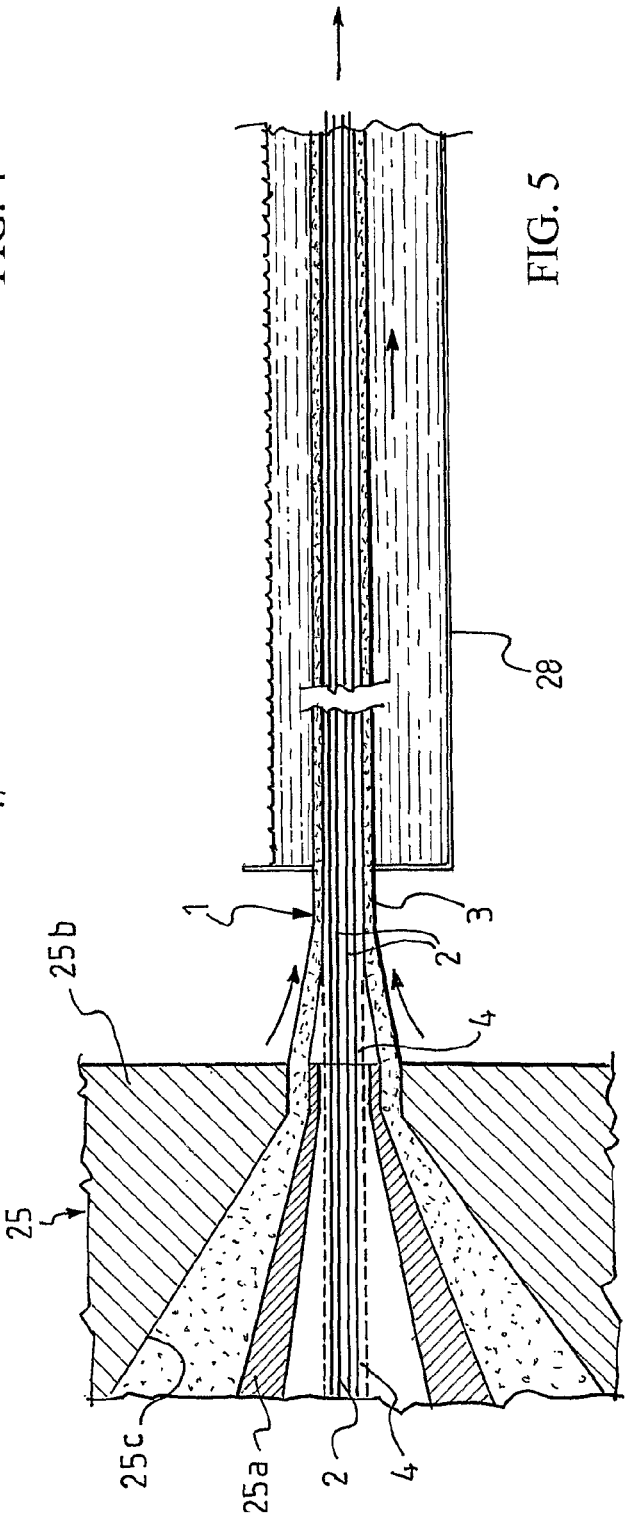

WATER-RESISTANT OPTICAL CABLE AND MANUFACTURING METHOD

CROSS REFERENCE TO RELATED APPLICATION

This application is a national phase application based on PCT/EP2004/010812, filed Sep. 27, 2004, the content of which is incorporated herein by reference.

BACKGROUND OF THE INVENTION

1. Field of the Invention

The present invention relates to a method for manufacturing an optical cable for communication comprising at least one micromodule blocked with respect to the propagation of water, as well as to a plant for manufacturing such an optical cable.

The present invention also relates to an optical cable for communication comprising at least one micromodule blocked with respect to the propagation of water, as well as to such a micromodule.

Transmission elements, in particular coated optical fibers, used in optical cables are typically housed, either individually or as a group, in buffering materials or elements.

For instance, one or more optical fibers, e.g. arranged in a group, bundle or ribbon of optical fibers, may be housed in a tube or flexible sheath (hereinafter referred to as "retaining element"), which may be made, for example, of polymeric material. The optical fiber(s) together with its (their) retaining element is (are) generally referred to in the art as "optical unit", "micromodule" or "module". Usually, said retaining element has a thin thickness and is endowed with specific mechanical properties (in particular, elastic modulus, ultimate tensile strength and elongation at break) so as to allow an easy access to the optical fiber(s) in order to facilitate both the connection between the optical fiber(s) and an user equipment, and the interconnection between cables. Said retaining element is also generally referred to as "microsheath" or "minisheath".

Moreover, said retaining element, usually, has an axial stiffness relatively low so as to slightly affect the fiber(s) attenuation due to mechanical stresses and strains which may occur during the thermal cycles to which said fiber(s) is (are) usually subjected.

An optical cable may contain a single micromodule or a plurality of micromodules. Said single micromodule or said plurality of micromodules are generally referred to as the optical core of the cable. The optical core is in turn typically inserted into a protecting sheath usually made of polymeric material.

Usually, each micromodule may comprise a bundle of optical fibers, typically in a number comprised between 2 and 12, housed in a retaining element as defined above. The optical fibers are arranged parallel or according to an open helix pattern (or S-Z stranding) around the axis of the micromodule, i.e. the optical fibers are stranded around the axis of the micromodule in sections with a first direction of stranding (S-shaped) alternating with sections with an opposite direction of stranding (Z-shaped).

Within each micromodule, the optical fibers may be arranged with or without clearance between their outer envelope and the inner surface of the retaining element of the micromodule. If no clearance is left between the optical fibers and the retaining element, the micromodule is called tight, while in the opposite case, i.e. if there is a clearance between the optical fibers and the retaining element, the micromodule is called loose.

In the present description and in the following claims, a micromodule shall be indicated as loose when the optical fibers are mechanically decoupled from the retaining element. Consequently, for a suitable length of a micromodule of the loose type (e.g. 1 meter) it is possible to extract a single optical fiber independently of the other optical fibers. Usually, it is possible to operate as disclosed above when the inner diameter of the retaining element is at least 1% larger than the diameter of the smallest circle enveloping the optical fibers defined therein, otherwise the micromodule shall be indicated as tight.

As already reported above, the micromodule allows an easy access to the optical fiber(s) housed therein both at the free end of the micromodule and at an intermediate position of the micromodule by simply tearing and slipping off the retaining element. By exerting a moderate combined pressure and tensile strength with the fingers, in fact, a predetermined length of retaining element can be easily removed so as to access to the optical fiber(s) remained uncovered.

Consequently, the mechanical properties of the polymeric material constituting the retaining element indicate that, apart from the containing function of the latter, one of the main aims of providing micromodules in optical cables is that of grouping different bundles of optical fibers so as to allow an easy identification of the different bundles. Such identification may be attained, for example, by providing micromodules with respective retaining elements having different colors.

The arrangement of the optical fibers in micromodules allows to assemble a high number of optical fibers in a relatively small optical cable (e.g. a cable with up to 144 optical fibers may have an external diameter lower than or equal to about 13 mm or less; cable with a lower number of fibers may have a correspondingly lower diameter), which makes cables including micromodules particularly suitable for urban distribution networks.

In the present description and in the following claims, the expression "blocked with respect to the propagation of water" means that the propagation of water is prevented or limited both in the micromodule and in the optical cable containing the same, in the sense that both the micromodule and the optical cable containing the same pass the test according to method F5B provided by International Standard IEC 60794-1-2: further details regarding the above test will be given in the examples which follow. The propagation of water is mainly intended as a spreading along the longitudinal direction of the micromodule which results in a progressive filling thereof.

2. Prior Art

Optical cables for communication comprising at least one micromodule (usually a plurality of micromodules) blocked with respect to the propagation of water are known. For example, U.S. Pat. No. 5,671,312 discloses optical cables comprising micromodules water-blocked by means of an oil having a viscosity comprised between 100 and 5000 mPa·s, such as for example a silicone oil. Each optical fiber is provided with such an oil by means of an applicator member such as a felt pad associated with an oil feed member and located upstream of the extrusion head used to extrude the retaining element around the optical fibers.

US patent application 2003/0168243 discloses an optical cable for telecommunication comprising micromodules water-blocked either by means of silicone or synthetic grease, oil or gel. The optical fibers are coated with such filling compounds before the optical fibers are passed through a die for extruding a thin retaining sheath clamping the optical fibers together. The use of swelling powder and/or swelling filaments is also envisaged. U.S. Pat. No. 5,751,880 discloses an optical unit for an optical fiber telecommunication cable, the unit comprising a tube of plastics material in which at least one optical fiber is loosely received, wherein the thickness of said tube is less than or equal to 0.5 mm, and wherein said material has a modulus of elasticity less than 1500 MPa at 20° C. and a stress/elongation curve without a yield point. Said tube could also contain a material providing sealing in the form of a gel which is not better described.

Optical cables are also known wherein the optical fiber(s) are inserted in a tube, sometimes called "buffer tube", which usually has a thickness higher than about 0.2 mm, typically of from about 0.3 mm to about 0.8 mm.

For example, International patent application WO 2004/034115 discloses buffer tubes, core tubes or slotted core fiber optic cable components, which are made of an extrudable blend of highly crystalline polypropylene and an impact modifying polymer. As disclosed in the above-mentioned patent application, said buffer tubes, which are modeled as having a 3.3 mm outside diameter and a 0.76 mm wall thickness, are typically filled with an optic cable hydrocarbon-based grease incorporating hydrocarbon oils surrounding the fibers and eliminating air space. The above-mentioned grease (also referred to as "gel") is said to provide a barrier against water penetration, which is detrimental to the optic transmission performance.

U.S. Pat. No. 5,911,023 discloses optical cable components such as buffer tubes, filler rods or jackets, made of a thermoplastic polyolefin, preferably, propylene or ethylene homopolymer, a propylene-ethylene copolymer, or a terpolymer including propylene and ethylene, characterized by a high melt flow index. The use of said material having a high melt flow index results in a substantial improvement in buffer tube crystallinity and crystallization rates, improved buffer tube crush resistance, reduced post extrusion shrinkage, improved gel compatibility, and improved excess fiber length control. The gel in the buffer tube is said to be a thixotropic, water blockable gel such as mineral gels, or petroleum gels.

SUMMARY OF THE INVENTION

The optical cables and the methods for manufacturing the same proposed by the above reported prior art, however, show some drawbacks.

As a matter of fact, in the prior art optical cables comprising micromodules water-blocked, for example, by means of oil, the water-blocking action exerted by the oil is unsatisfying because incomplete and ineffective in time, particularly for the following reasons. The oil leaks out from the micromodules when the micromodules are subjected to a water head or due to a migration effect of the oil through the retaining element after a long storing period. The Applicant has found that, even by using oil having a high viscosity (higher than 5000 mPa·s), such leakage cannot be avoided but only postponed in time.

Furthermore, also an increase of the ambient temperature, which may correspond to a decreasing of the oil viscosity, may cause a leakage of the oil from the micromodules. This is particularly undesirable both during the service life of the cable and during a possible long storing period of the micromodules or of the cable incorporating the same which have been previously coiled in a bobbin.

As disclosed above, in US patent application 2003/0168243 and in U.S. Pat. No. 5,751,880, the interspaces located among the optical fibers within the micromodules are filled by means of a gel. The US patent application 2003/0168243 also discloses that the optical fibers are coated with a gel before the optical fibers are passed trough a die for extruding a thin retaining sheath clamping the optical fibers together.

However, the Applicant has observed that no indication was made in such references about the chemical, physical, and rheological properties which such gel must have in order to be advantageously used to manufacture a water-blocked micromodule as well as an optical cable containing the same.

Within the present invention, the Applicant has perceived that in order to manufacture a micromodule blocked with respect to the propagation of water as well as an optical cable comprising the same, said filling compound is required to have a combination of specific properties having selected values.

In particular, the Applicant has found that a filling compound suitable for manufacturing such a micromodule as well as an optical cable comprising the same should be pseudoplastic.

A pseudoplastic compound has a viscosity which decreases as the shear rate in a steady shear flow increases (a steady shear flow being a shear flow in which the velocity is independent of time at every point). Such behavior is not time dependent. Further details about pseudoplastic behavior may be found, for example, in "An Introduction to Rheology" ($1^{st}$ Ed. —1989), by H. A. Barnes, J. F. Hutton and K. Walters, Ed., pp. 16-23. Furthermore, the Applicant has found that, in order to allow an homogeneous distribution of the filling compound around the optical fiber(s) and in the interspaces between the same, said filling compound should also have a specific viscosity in the operating conditions applied during the manufacturing of the micromodule. More in particular, the Applicant has found that there is a correlation between the viscosity of the filling compound at 100° C. and at a shear rate of about 10 $s^{-1}$ and said operating conditions.

The Applicant has noticed that the filling compound viscosity defined above is not only relevant when referred to the operating conditions, but it is also of particular relevance when the manufacturing process is performed at a high production rate, i.e. when the optical fiber(s) to be incorporated in the filling compound is (are) conveyed at high speed (in the order of 20 m/min or higher).

Moreover, the Applicant has noticed that the viscosity of the filling compound is even more relevant when a micromodule of the loose type is produced in case the difference between the advancement speed of the optical fiber(s) and the extrusion speed of the retaining element in the extrusion line is remarkably high. In particular, said difference is remarkably high at the outlet section of the extrusion head where the advancement speed of the optical fiber(s) is about twice the extrusion speed of the retaining element.

As a matter of fact, the retaining element is extruded with a certain diameter and thickness at a given extrusion speed, and then is subjected to a size reduction which has to take place at a suitable draw down ratio in order to reduce both its diameter and its thickness. Said draw down ratio depends on the properties of the thermoplastic polymeric composition of the retaining element. Moreover, in order to avoid the post-extrusion shrinkage of the retaining element, it is better to operate at a low draw down ratio.

In the present description and in the subsequent claims, the term "draw down ratio" (DDR) means the ratio between the cross-sectional area defined between two adjacent dies of the extruder apparatus and defining the section of the passage of the extruded thermoplastic polymeric composition of the retaining element, said area being calculated at the outlet section of the extrusion head, and the cross-sectional area of the effective final extruded retaining element. Said draw down ratio is an index of the speed difference between the coated optical fiber(s) and the extruded retaining element.

While the diameter and the thickness of the retaining element decrease, the extrusion speed of the retaining element progressively increases, until it reaches the advancement speed of the optical fiber(s) which is (are) fed at a speed higher than the extrusion speed of the retaining element. When the two speeds become equal, the congruence of the retaining element and the optical fiber(s) is obtained.

During the above-mentioned diameter and thickness decreasing, which is carried out in order to reach the desired diameter and thickness of the retaining element, a certain mutual yield takes place between the retaining element and the coated optical fiber(s), until said retaining element finally reaches the same advancement speed of the optical fiber(s).

The Applicant has noticed that at the temperature at which the filling compound is applied to the optical fiber(s) (e.g. around 100° C.), a too low viscosity of said filling compound does not ensure an adequate adhesion to the optical fibers and makes the filling compound drip out of the fiber bundles before these are inserted into the retaining element, while a too high viscosity results in the impossibility of manufacturing a micromodule with a regular shape. Moreover, a too high viscosity may cause a laceration of the retaining element.

Furthermore, the Applicant has also noticed that, in order to allow both an homogenous distribution of the filling compound around the optical fibers(s) and in the interspaces between the same and a good adhesion of the filling compound to the optical fiber(s), the filling compound should also have a suitable wettability.

The term "wettability" means the quality or state of being wettable: the degree to which something can be wet. The wettability can be visually observed. The Applicant has observed that there is a strong correlation between the cross-over (CO) of the curves of the loss modulus G" and the storage modulus G', measured at about 100° C. and at decreasing frequencies, and the wettability. The lower is the frequency at which the cross-over occurs, the higher is the wettability. Further details about the cross-over measurement will be found hereinbelow and in the examples which follow.

Consequently, the Applicant has found that it is possible to manufacture a micromodule, as well as an optical cable containing the same, which is blocked with respect to the propagation of water by means of a method comprising firstly an embedding of the optical fiber(s) within a filling compound and subsequently an extrusion of a retaining element around the coated optical fiber(s), provided the filling compound has suitable properties, namely a suitable viscosity and a suitable wettability. The use of said filling compound allows to manufacture a micromodule as well as an optical cable comprising the same endowed with good water blocking properties.

In the first aspect, the present invention therefore relates to a method for manufacturing an optical cable for communication comprising at least one micromodule, said micromodule being blocked with respect to the propagation of water, said method comprising the steps of:
  providing at least one optical fiber;
  embedding said at least one optical fiber in a pseudoplastic filling compound;
  extruding a retaining element made of a thermoplastic polymeric composition around said at least one optical fiber so embedded in said filling compound to obtain a micromodule;

wherein said filling compound has a viscosity comprised between 3 Pa·s and 30 Pa·s, preferably between 5 Pa·s and 25 Pa·s, at a shear rate of $10 \ s^{-1}$ and at a temperature of 100° C., as well as a cross-over lower than 30 Hz, preferably comprised between 5 Hz and 25 Hz, at a temperature of 100° C.

For the purpose of the present description and of the claims which follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

As a consequence of the embedding step, said filling compound coats the optical fiber(s) with a continuous layer and fills any space between said optical fiber(s).

According to the method of the invention for manufacturing an optical cable comprising a micromodule described above, the embedding step is carried out before the extrusion step. In other words, the pseudoplastic filling compound is applied to said at least one optical fiber before extruding a retaining element made of a thermoplastic polymeric composition around said at least one optical fiber so provided with the filling compound.

Thanks to the rheological properties of the filling compound given above, which in process conditions do not hinder but rather facilitate the homogeneous application of the filling compound to the optical fiber(s), it is advantageously possible to manufacture a micromodule and, accordingly, an optical cable comprising the same, of good quality in a substantially continuous process also when the production rate is high. By way of example, it is possible to manufacture micromodules at a speed comprised between 50 and 150 m/min depending on the material of which the retaining element is made of and on the size of the extrusion apparatus.

More in detail, the pseudoplastic behavior of the filling compound allows an easy application of the filling compound during the manufacturing process, that is at the conditions in which the filling compound is subjected to shear stress.

The above-mentioned shear rate of $10 \ s^{-1}$ and temperature of 100° C. refer to a shear rate and, respectively, to a temperature of the same order of magnitude of typical process conditions which can be found during a manufacturing process which involves the inclusion of the optical fiber(s) in the filling compound and the subsequent extrusion of the retaining element around the optical fiber(s) included in the filling compound.

Furthermore, by suitably selecting the diameter of the retaining element, i.e. by using an extrusion cross-head equipped with an extrusion die of suitable size, it is advantageously possible to manufacture a micromodule of high quality in which the optical fiber(s) are housed in a loose manner, since, as illustrated above, the reduction of both the diameter and the thickness of the retaining element following the extruding step is advantageously facilitated by the decoupling ability of the filling compound which has been applied around the optical fibers and in the interspaces between the optical fibers. The filling compound, in fact, advantageously decouples the optical fibers from the retaining element.

According to a preferred embodiment of the method of the invention, a plurality of optical fibers is provided in the micromodule. In such a way, it is advantageously possible to manufacture an optical cable having an increased transmission capability. Preferably, the method of the invention further comprises the step of stranding the plurality of optical fibers together, preferably according to a SZ stranding technique. Preferably, the method of the invention further comprises the step of calibrating said filling compound embedding said at least one optical fiber so as to obtain an outer coating layer of filling compound having a predetermined thickness. Thanks to said preferred embodiment, the control of the final size of the retaining element, i.e. of the size of the retaining element after the extruding step thereof, is advantageously further improved.

Preferably, the above-mentioned step of embedding the at least one optical fiber in the filling compound is carried out by having said at least one optical fiber to pass trough a mass of the pseudoplastic filling compound.

In such a way, the application and the calibration of the filling compound are advantageously simultaneously achieved in a simple manner.

Preferably, the method of the invention further comprises the step of cooling said retaining element after the extruding step, thus allowing to collect on a bobbin the micromodules manufactured in this manner, and subsequently to proceed with the additional manufacturing steps required to complete the manufacture of the optical cable of the invention starting from said micromodules.

For example, such additional manufacturing steps may comprise the steps of enclosing at least one micromodule within a number of conventional layers, such as for example tubes, sheaths, etc. optionally including reinforcing elements, as described more in detail in the following with reference to the description of the optical cable of the invention.

Preferably, the above-mentioned additional manufacturing steps comprise the step of assembling a plurality of micromodules, e.g. by stranding the same together and by subsequently enclosing such plurality of micromodules within a number of layers.

More in particular, in order to manufacture an optical cable comprising micromodules in a central loose tube, known in the art with the term "Micromodules in Central Loose Tube cable (M-CLT), the method of the invention preferably further comprises the steps of stranding the micromodules manufactured so far, generally according to an helix of the "SZ" type, and of incorporating the group of micromodules so stranded, in sequence, in a protective tube, a tape and/or an optional textile reinforcing armor, an outer sheath, in which two opposite longitudinal reinforcing elements and two opposite rip-cords for cutting the sheath, arranged tangentially to the inner diameter of the outer sheath, are preferably preliminarily embedded.

Alternatively, in order to manufacture an optical cable comprising micromodules in stranded loose tubes, known in the art with the term "Micromodules in Stranded Loose Tubes cable" (M-SLT), the method of the invention preferably further comprises the steps of stranding a plurality of groups of micromodules, generally according to a helix of "SZ" type, of incorporating each of said groups of micromodules in a respective tube, of stranding such tubes around a central reinforcing element, and of incorporating the optical cable core manufactured so far, in sequence, in a tape optionally reinforced by a textile armor and in an outer sheath in which two opposite rip-cords for cutting the sheath arranged tangentially to the inner diameter of the outer sheath are preferably preliminarily embedded.

Preferably, the filling compound comprises a structured hydrophobic material such as, for example, a gel obtained from a liquid and from at least one thickening agent.

The liquid is preferably selected from the group comprising: polyalphaolefin oils, polyglicol oils, polybutene oils, polyisobutylene oils, polypropene oils, silicone oils (such as, for example, polydimethylsiloxane oils), fluorinated oils (such as, for example, perfluoropolyether oils), or mixtures thereof.

The thickening agent is preferably selected from the group comprising: silica, bentonite, polytetrafluoroethylene, or mixtures thereof.

Alternatively, the thickening agent may include a polymer, preferably an elastomeric polymer, more preferably a block copolymer, such as for example styrene-ethylene-propylene (SEP), styrene-ethylene-butylene (SEB), styrene-ethylene-butylene-styrene (SEBS), or mixtures thereof. Examples of polymers suitable for the purpose may be found in patent U.S. Pat. No. 6,278,824, U.S. Pat. No. 6,160,939, U.S. Pat. No. 4,798,853 and in patent application WO 93/05113. Combinations of an inorganic and an organic thickening agent may also be envisaged, such as for example a mixture of silica and a polymer, preferably an elastomeric copolymer of the above-mentioned type.

Such preferred filling compounds are chemically compatible with the materials normally employed to form the protective coating layer conventionally applied on the optical fibers (for example UV curable acrylate coating). In addition, said preferred filling compounds, are preferably chemically compatible with the materials preferably employed to form the retaining element of the micromodules, such as for example a thermoplastic polymeric composition based on olefin polymers. Such compositions are preferably of the LSOH type (Low Smoke Zero Halogen, i.e. halogen free and having a low emission of smoke) and are preferably based on ethylene copolymers, optionally including mineral fillers as described in more detail in the following.

Preferably, the above-mentioned liquid intended to form the gel by the addition of a thickening agent is a silicone oil. Preferably, said silicone oil has a viscosity comprised between 100 and 13000 mPa·s at 20° C., more preferably between 1000 and 6000 mPa·s at 2° C.

Preferably, the thickening agent comprises fumed silica, more preferably a mixture of fumed silica and of an at least partially silanized silica. Advantageously, the partial silanization of the hydroxyl groups renders the silica hydrophobic, which allows to obtain an improved resistance to humidity.

Preferably, the ratio by weight between the non-silanized silica and the silanized silica is comprised between 0.5 and 5, more preferably between 0.65 and 4.30.

Preferably, the ratio by weight between the liquid and the thickening agent is comprised between 20/1 and 10/1.

Preferably, the retaining element has a thickness which is comprised between 0.05 and 0.2 mm, more preferably between 0.1 and 0.2 mm.

Preferably, the thermoplastic polymeric composition intended to form the retaining element comprises:
(a) at least one first olefin polymer, and
(b) at least one inorganic filler.

More preferably, said thermoplastic polymeric composition further comprises (c) at least-one second olefin polymer selected from:
($c_1$) terpolymers of at least one α-olefin, at least one acrylic acid ester, and at least one α,β-olefinically unsaturated dicarboxylic acid reagent or its derivatives such as, for example, anhydrides, metal salts, imides, esters, or at least one glycidyl acrylate;
($c_2$) terpolymers of ethylene, at least one α,β-olefinically unsaturated dicarboxylic acid anhydride, and at least one vinyl ester of a saturated carboxylic acid;
($C_3$) olefin polymers grafted with at least one ethylenically unsaturated monomer.

Preferably, said thermoplastic polymeric composition has an elastic modulus lower than or equal to 500 MPa at a temperature of 20° C., more preferably comprised between 50 and 500 MPa and, still more preferably, between 150 and 400 MPa.

Preferably, said thermoplastic polymeric composition has an ultimate tensile strength lower than or equal to 12 MPa, more preferably comprised between 5 and 10 MPa.

Preferably, said thermoplastic polymeric composition has an elongation at break lower than or equal to 100%, more preferably comprised between 30 and 80%.

Preferably, said first olefin polymer (a) may be selected from α-olefin polymers including homopolymers, copolymers, terpolymers, or mixtures thereof, containing one or more monomeric units. Polymers of α-olefins containing from 2 to 20 carbon atoms, preferably from 2 to 8 carbon atoms, are preferred.

Specific examples of said α-olefins are: ethylene, propylene, 1-butene, 1-pentene, 4-methyl-1-pentene, 1-octene, 1-decene, 4-ethyl-1-hexene, or mixture thereof.

According to a further preferred embodiment, the first olefin polymer (a) may be selected, for example, from: low density polyethylene (LDPE), linear low density polyethylene (LLDPE), ultra low density polyethylene (ULDPE); atactic polypropylene; high and low density poly-1-butene; poly-4-methyl-1-pentene; ultra-low-molecular weight polyethylene; ethylene-based ionomers; poly-4-methyl-1-pentene; ethylene propylene copolymers; ethylene-propylene-diene copolymers (EPDM); copolymer of ethylene and/or propylene with other copolymerizable monomers such as, for example, ethylene-1-butylene copolymer, ethylene-vinyl acetate copolymer (EVA), ethylene-methyl acrylate copolymer, ethylene-butyl acrylate copolymer (EBA), ethylene-ethyl acetate copolymer, propylene-4-methyl-1-pentene copolymer, ethylene-vinyl alcohol copolymer; ethylene acrylic elastomers such as, for example, ethylene-methyl acrylate-acrylic acid terpolymers; or mixtures thereof. Halogenated olefins, polymers and copolymers, may also be used. Ethylene-butyl acrylate copolymer, ethylene-vinyl acetate copolymer, or mixtures thereof, are preferred.

Examples of the first olefin polymer (a) which may be used and are available commercially are the products known by the name of Lotryl® from Atofina, or Flexirene® from Polimeri Europa.

Alternatively, said first olefin polymer (a) may be selected from copolymers of ethylene with at least one aliphatic α-olefin selected, for example, from: propylene, 1-butene, isobutylene, 1-pentene, 4-methyl-1-pentene, 1-hexene, 1-octene, 1-dodecene, or mixtures thereof, and optionally a polyene, preferably a diene.

The above copolymer of ethylene with at least one aliphatic α-olefin generally has the following composition: 50 mol %-98 mol %, preferably 60 mol %-93 mol %, of ethylene; 2 mol %-50 mol %, preferably 7 mol %-40 mol %, of an aliphatic α-olefin; 0 mol %-5 mol %, preferably 0 mol %-2 mol %, of a polyene.

Examples of copolymers of ethylene with at least one aliphatic α-olefin which may be used in the present invention and which are currently commercially available are the products Engage® from DuPont-Dow Elastomers, or Exact® from Exxon Chemical.

Preferably, the above-mentioned inorganic filler (b) is intended to control physical parameters, such as mechanical properties and flame retardancy, of the retaining element, as well as to obtain an easy strippable retaining element. For this purpose, the inorganic filler (b) may be selected, for example, from: hydroxides, hydrated oxides, salts or hydrated salts of metals, in particular of calcium, magnesium, aluminum, or mixtures thereof. Said inorganic filler (b) may be used also in admixture with other inorganic fillers such as silicates.

According to a further preferred embodiment, the inorganic filler (b) may be selected, for example, from: magnesium hydroxide (including natural magnesium hydroxide, e.g. from the milled brucite mineral), aluminum hydroxide, aluminum oxide (including kaolin, i.e. an hydrated aluminum silicate), alumina trihydrate, magnesium carbonate hydrate, magnesium carbonate, magnesium calcium carbonate hydrate, magnesium calcium carbonate, or mixtures thereof. Magnesium hydroxide, aluminum hydroxide, alumina trihydrate ($Al_2O_3 3H_2O$), or mixtures thereof, are particularly preferred. Minor amounts, generally less than 25% by weight, of one or more inorganic oxides or salts such as CoO, $TiO_2$, $Sb_2O_3$, ZnO, $Fe_2O_3$, $CaCO_3$ or mixtures thereof, may advantageously be added. The above-mentioned metal hydroxides, in particular the magnesium and aluminum hydroxides, are preferably used in the form of particles with sizes which may range from 0.1 μm to 20 μm, preferably from 0.5 μm to 10 μm.

The inorganic filler (b) may be advantageously used in the form of coated particles. Preferred coating materials are saturated or unsaturated fatty acids containing from 8 to 24 carbon atoms, or metal salts thereof, such as, for example: oleic acid, palmitic acid, stearic acid, isostearic acid, lauric acid; magnesium or zinc stearate or oleate; or mixtures thereof.

The inorganic filler (b) is preferably present in the thermoplastic polymeric composition in an amount of from 40 parts by weight to 200 parts by weight, preferably from 75 parts by weight to 150 parts by weight, with respect to 100 parts by weight of the first olefin polymer (a).

Examples of inorganic fillers (b) which may be used and are available commercially are the products known by the name of Hydrofy® from Sima, or Atomfor® from Omya.

It has to be noted that the addition of the inorganic filler (b), particularly in amounts equal to or higher than 100 parts by weight with respect to 100 parts by weight of the first olefin polymer (a), may also give advantageous flame retardant properties to the thermoplastic polymeric composition.

Preferably, the terpolymers ($c_1$) may comprise from 50% by weight to 99% by weight of at least one α-olefin, from 0.5% by weight to 40% by weight of at least one acrylic acid ester, and from 0.3% by weight to 10% by weight of at least one dicarboxylic acid reagent or its derivatives, or of at least one glycidyl acrylate.

The α-olefin which may be advantageously used in the preparation of the terpolymers ($c_1$) may be selected, for example, from α-olefins containing from 2 to 20 carbon atoms, preferably from 2 to 8 carbon atoms. Ethylene, propylene, or mixture of ethylene and propylene, are preferred.

The acrylic acid esters which may be advantageously used in the preparation of the terpolymers ($c_1$) may be selected, for example, from compounds having the following formula:

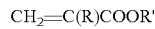

$$CH_2\!=\!C(R)COOR'$$

wherein R represents hydrogen, or a lower alkyl group containing from 1 to 4 carbon atoms such as methyl or ethyl, and R' represents a lower alkyl group having from 1 to 6 carbon atoms.

Specific examples of the acrylic acid esters are: methyl acrylate, ethyl acrylate, butyl acrylate, methyl methacrylate, ethyl methacrylate, ethyl ethacrylate, or mixtures thereof. The α,β-olefinically unsaturated dicarboxylic acid reagent or its derivatives which may be advantageously used in the preparation of the first terpolymer may be selected, for example, from: maleic acid, maleic anhydride, fumaric acid, mesaconic acid, itaconic acid, citraconic acid, itaconic anhydride, citraconic anhydride, monomethyl maleate, monosodium maleate, or mixtures thereof. Maleic anhydride is preferred.

The glycidyl acrylate which may be advantageously used in the preparation of the terpolymers ($c_1$) may be selected, for example, from compounds having the following formula:

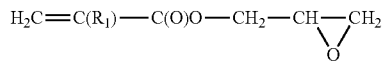

wherein $R_1$ is hydrogen or a lower alkyl group containing from 1 to 6 carbon atoms. Preferably, $R_1$ is hydrogen, methyl, or ethyl.

Specific example of glycidyl acrylates are: glycidyl acrylate, glycidyl methacrylate, glycidyl ethacrylate, or mixtures thereof.

According to a preferred embodiment, the terpolymers ($c_1$) may be selected, for example, from: ethylene-methyl acrylate-maleic anhydride, ethylene-ethyl acrylate-maleic anhydride, ethylene-butyl acrylate-maleic anhydride, propylene-methyl acrylate-maleic anhydride, propylene-ethyl acrylate-maleic anhydride, ethylene-methyl acrylate-glycidyl methacrylate, ethylene-methyl acrylate-glycidyl acrylate, or mixtures thereof.

The terpolymers ($c_1$) which may be used may be prepared by known techniques such as, for example, by means of a high-pressure free radical polymerization process. A more detailed description of said processes may be found, for example, in patents U.S. Pat. No. 4,644,044 and U.S. Pat. No. 4,617,36 or in patent application GB 2,091,745.

Examples of terpolymers ($c_1$) which may be used and are available commercially are the products known by the name of Lotader® MAH, or Lotader® GMA from Atofina.

The α,β-olefinically unsaturated dicarboxylic acid anhydrides which may be advantageously used in the preparation of the terpolymer ($c_2$) may be selected from: citraconic anhydride, itaconic anhydride, tetrahydrophthalic anhydride, maleic anhydride, or mixture thereof. Maleic anhydride is preferred.

The vinyl ester of a saturated carboxylic acid which may be advantageously used in the preparation of the terpolymers ($c_2$) may be selected, for example, from vinyl ester of a saturated carboxylic acid containing from 2 to 6 carbon atoms. Vinyl acetate is preferred.

The terpolymer ($c_2$) is preferably ethylene-vinyl acetate-maleic anhydride.

Examples of terpolymer ($c_2$) which may be used according to the present invention and are available commercially are the products known by the name of Orevac® 9305, or Orevac® 9307 from Atofina.

With regard to the olefin polymers ($c_3$), which are grafted with at least one ethylenically unsaturated monomer, the olefin polymers may be selected, for example, from: homopolymers of ethylene; homopolymers of propylene; copolymers of ethylene and propylene especially copolymers of propylene with minor amounts of ethylene as in impact and random copolymer of propylene; terpolymers of ethylene, propylene and dienes (e.g. so called EPDM); copolymers of ethylene with at least one $C_3$-$C_{10}$ hydrocarbon α-olefin; copolymers of ethylene and vinyl acetate, alkyl acrylate or alkyl methacrylate.

Specific examples of the $C_3$-$C_{10}$ hydrocarbon α-olefin are: butene-1, hexene-1, octene-1, or mixtures thereof.

Specific examples of the alkyl groups of the acrylates or methacrylates are: methyl, ethyl, propyl, butyl, or mixtures thereof.

The copolymers of ethylene may include both linear low density polyethylene (LLDPE) and very low density polyethylene (VLDPE).

The ethylenically unsaturated monomer may be selected, for example, from ethylenically unsaturated carboxylic acids or derivatives thereof, ethylenically unsaturated carboxylic acid anhydrides, or mixture thereof.

Specific examples of carboxylic acids, which may be selected from mono-, di- or polycarboxylic acids, are: acrylic acid, methacrylic acid, maleic acid, fumaric acid, itaconic acid, crotonic acid, or mixtures thereof.

Specific examples of anhydrides are: itaconic anhydride, maleic anhydride, substituted maleic anhydride (e.g. dimethyl maleic anhydride), nadic methyl anhydride, tetrahydrophthalic anhydride, or mixture thereof. Maleic anhydride is preferred.

Specific examples of unsaturated carboxylic acid derivatives are: salts, amides, imides or esters such as, for examples, mono- and disodium maleate, acrylamide, maleimide, glycidyl methacrylate, dimethyl fumarate, or mixture thereof.

Techniques for the grafting of such monomers onto olefin polymers are known in the art and are described, for example, in patent U.S. Pat. No. 4,612,155, or in European patent application EP-A-0 398 604.

Examples of olefin polymers ($c_3$) grafted with at least one ethylenically unsaturated monomer which may be used according to the present invention and are available commercially are the products known by the name of Fusabond® from DuPont, or Orevac® G from Atofina.

Preferably, the second olefin polymer (c) is present in the thermoplastic polymeric composition in an amount of from 3 parts by weight to 10 parts by weight, more preferably from 5 parts by weight to 8 parts by weight, with respect to 100 parts by weight of the first olefin polymer (a).

The thermoplastic polymeric composition intended to form the retaining element may advantageously comprise antioxidant additives, preferably selected among polymerized trimethyldihydroquinoline, 4,4'-thiobis (3 methyl-6 t-butyl)phenol; pentaerythrityl-tetrakis[3-(3,5-di-t-butyl-4-hydroxyphenyl)propionate], 2,2'-thiodiethylene-bis[3-(3,5-di-t-butyl-4-hydroxyphenyl)propionate], or mixtures thereof.

Other conventional additives, such as processing coadjuvants, lubricants, pigments, slipping agents, antioxidants and other fillers, may advantageously be added to the thermoplastic polymeric composition.

Processing coadjuvants usually added to the thermoplastic polymeric composition are, for example, calcium stearate, zinc stearate, stearic acid, paraffin wax, silicone rubbers, or mixtures thereof.

According to a further aspect thereof, the present invention refers to a plant for manufacturing an optical cable for communication comprising at least one micromodule, said micromodule being blocked with respect to the propagation of water, said plant comprising:
- an apparatus for embedding said at least one optical fiber in a pseudoplastic filling compound; and
- an apparatus for extruding a retaining element made of a thermoplastic polymeric composition around said at least one optical fiber so embedded in said filling compound to obtain a micromodule.

In other words, the apparatus for embedding the at least one optical fiber in the filling compound is arranged upstream of the apparatus for extruding the retaining element around the at least one optical fiber embedded in the filling compound.

Preferably, the apparatus for embedding the at least one optical fiber in the filling compound comprises a chamber containing the pseudoplastic filling compound, preferably a mass thereof. More preferably, the chamber is provided with an inlet opening and an outlet opening, preferably arranged at opposite sides of the chamber, for the inlet of the at least one optical fiber to be embedded in the filling compound and, respectively, for the outlet of the at least one optical fiber embedded in the filling compound.

The outlet opening of the chamber containing the filling compound is preferably shaped so as to impart a predetermined form to the filling compound embedding the at least one optical fiber. For example, if the outlet opening is substantially circular-shaped, the filling compound takes a substantially cylindrical shape around the at least one optical fiber.

Alternatively to this preferred embodiment, the chamber may be provided with an application die housed in an outlet opening of the chamber. In this way, it is advantageously possible to provide a set of interchangeable application dies adapted to calibrate the coating thickness of the filling compound embedding the optical fiber(s) according to a desired size.

According to a preferred embodiment thereof, the plant of the invention further comprises a device for feeding said at least one optical fiber to said chamber, preferably to said inlet opening thereof, along a predetermined conveying direction.

Preferably, the plant further comprises a plate for stranding a plurality of said optical fibers, preferably according to a SZ technique, said stranding plate being arranged upstream of the above-mentioned chamber containing the filling compound. The stranding plate is preferably arranged so as to rotate alternatively clockwise and counterclockwise around a rotation axis substantially parallel to said conveying direction.

Preferably, the plant further comprises a cooling through for cooling the retaining element immediately after the extrusion thereof. For such a purpose, the cooling through is arranged downstream of the extrusion apparatus of the retaining element.

The above-mentioned plant for manufacturing the optical cable preferably comprises additional conventional devices intended to enclose at least one micromodule within at least one conventional layer, preferably a plurality of layers, such as for example tubes, sheaths, etc. optionally including reinforcing elements, as described more in detail in the following with reference to the description of the optical cable of the invention.

Preferably, the plant for manufacturing the optical cable further comprises a device for assembling a plurality of micromodules, said device preferably including a device for stranding the same together and, downstream thereof, a device for enclosing such plurality of micromodules within a number of layers.

Preferably, if the optical cable to be manufactured comprises a plurality of micromodules, the plant for manufacturing the optical cable comprises additional conventional devices intended to assemble such a plurality of micromodules and to enclose the micromodules within a number of conventional layers.

According to a further aspect, the present invention relates to an optical cable for communication comprising at least one micromodule blocked with respect to the propagation of water, wherein said micromodule comprises:

at least one optical fiber;
a retaining element for housing said at least one optical fiber; and
a pseudoplastic filling compound having a viscosity comprised between 3 Pa·s and 30 Pa·s, preferably between 5 Pa·s and 25 Pa·s, at a shear rate of 10 s$^{-1}$ and at a temperature of 100° C., as well as and a cross-over lower than 30 Hz, preferably comprised between 5 Hz and 25 Hz, at a temperature of 100° C.

Preferably, the filling compound fills at least 85%, more preferably at least 90%, of the volume defined within the retaining element and the optical fiber(s).

According to a preferred embodiment, the optical cable of the invention comprises at least one micromodule which includes a bundle of optical fibers.

According to a further preferred embodiment, particularly suitable for cables having medium-high transmission capability, the optical cable of the invention comprises a plurality of micromodules and at least one radially outer sheath with respect to said plurality of micromodules.

In case the optical cable comprises a plurality of micromodules and at least one outer sheath arranged in a radially outer position with respect to the same, the optical cable preferably further comprises at least one reinforcing element longitudinally embedded in said outer sheath, more preferably embedded tangentially to the inner diameter of the outer sheath.

According to a further preferred embodiment, particularly suitable for cables having high-very high transmission capability, the optical cable of the invention further comprises a plurality of tubes. Each of said tubes is arranged in a radially outer position with respect to a plurality of said micromodules and in a radially inner position with respect to said at least one outer sheath.

In case the optical cable comprises a plurality of micromodules so arranged, the optical cable preferably further comprises a central reinforcing element longitudinally extending in a central radially inner position with respect to said outer sheath, said plurality of tubes being stranded around said central reinforcing element.

According to a further aspect, the present invention also provides a micromodule blocked with respect to the propagation of water comprising:

at least one optical fiber;
a retaining element for housing said at least one optical fiber; and
a pseudoplastic filling compound having a viscosity comprised between 3 Pa·s and 30 Pa·s, preferably between 5 Pa·s and 25 Pa·s, at a shear rate of 10 s$^{-1}$ and at a temperature of 100° C., as well as a cross-over lower than 30 Hz, preferably comprised between 5 Hz and 25 Hz, at a temperature of 100° C.

Preferred embodiments of the micromodule of the invention include a retaining element having a thickness of 0.05 to 0.2 mm; a retaining element having a thickness of 0.1 to 0.2 mm; and a retaining element made of a thermoplastic polymeric composition comprising; (a) at least one first olefin polymer, and at least one inorganic filler.

Preferred embodiments of the micromodule of the invention also include a filling compound which comprises a gel obtained from at least one liquid and from at least one thickening agent, and wherein said liquid is selected from the group of: polyalphaolefin oils, polyglycol oils, polybutene oils, polyisobutylene oils, polypropene oils, silicone oils, fluorinated oils, or mixtures thereof, and wherein said thickening agent is selected from the group of: silica, bentonite, polytetrafluoroethylene, or mixtures thereof, or wherein said thickening agent is a block copolymer, such as, styrene-ethylene-propylene (SEP), styrene-ethylene-butylene (SEB), styrene-ethylene-butylene-styrene (SEBS), or mixtures thereof, or wherein said thickening agent is a mixture of fumed silica and of an at least partially silanized silica, and wherein the ratio by weight between the liquid and thickening agent is preferably 20/1 to 10/1. Such preferred embodiments of the micromodule of the invention correspond to the preferred embodiments of the optical cable of the invention comprising at least one micromodule already discussed above.

BRIEF DESCRIPTION OF THE FIGURES

Additional features and advantages of the invention will become more readily apparent from the description of some preferred embodiments with reference to the attached drawings in which, for illustrative and not limiting purposes, preferred embodiments of a micromodule, of optical cables including a plurality of such micromodules, as well as of a plant for carrying out a preferred embodiment the method reported above, are represented.

In the drawings:

FIG. 4 is a schematic view of a plant for manufacturing the micromodule of FIG. 1, which plant comprises, inter alia, an extrusion head and a cooling through;

FIG. 5 is an enlarged view of the extrusion head and of the cooling through of the plant of FIG. 4.

DETAILED DESCRIPTION OF PREFERRED EMBODIMENTS

Figure 1:
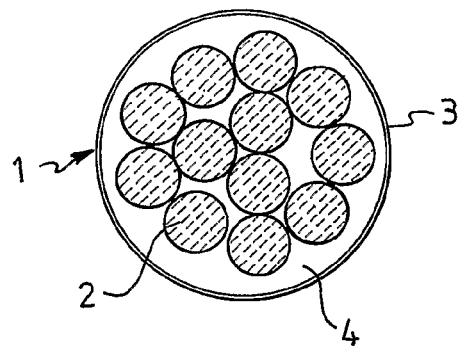
FIG. 1 is a cross-sectional view of a micromodule blocked with respect to the propagation of water of an optical cable for communication according to the invention.

With reference to FIG. 1, a micromodule blocked with respect to the propagation of water intended to be employed to manufacture an optical cable for communication according to the invention is generally indicated at 1.

The micromodule 1 comprises a plurality of optical fibers 2, for example a bundle of optical fibers, and a retaining element 3 for containing the optical fibers 2, which retaining element 3 is arranged in a radially outer position with respect to the plurality of optical fibers 2. According to a preferred embodiment shown in FIG. 1, the retaining element 3 of the micromodule 1 is made of a thermoplastic polymeric composition having an elastic module lower than 500 MPa at 20° C., an ultimate tensile strength comprised between 5 and 10 MPa, and an elongation at break comprised between 30 and 80%.

The retaining element 3 has a thickness which is preferably comprised between 0.05 and 0.2 mm, more preferably between 0.1 and 0.2 mm. In the case of a micromodule containing 12 optical fibers, such as that shown in FIG. 1, the micromodule 1 has an overall size having a maximum transversal dimension comprised between 1.25 mm and 1.45 mm.

The micromodule 1 further comprises a pseudoplastic filling compound 4. The filling compound 4 has in particular a viscosity of 19 Pa·s at a shear rate of $10 \, s^{-1}$ and at a temperature of 100° C., as well as a cross-over lower than 10 Hz, for example comprised between 5 and 10 Hz, at a temperature of 100° C. The determination of the above-mentioned viscosity and cross-over was effected as described in more detail in the following.

The filling compound 4 comprises for example a silicone oil having preferably a viscosity of 5000 mPa·s and silica preferably comprising a combination of fumed silica (e.g. CAB-O-SIL® H-5, available from Cabot Corporation, Boston, Mass.) and of hydrophobic fumed silica treated with dimethyldichlorosilane (e.g. CAB-O-SIL® TS-610). The untreated silica has preferably a B.E.T. surface area of 300 $m^2/g$ and the treated silica has preferably a B.E.T. surface area of 120 $m^2/g$.

Preferably, the ratio by weight between the silicone oil and the silica is comprised between 20/1 and 10/1.

In particular, according to the preferred embodiment shown in FIG. 1, the plurality of optical fibers 2 is housed within the retaining element 3 in a loose manner. More particularly, the inner diameter of the retaining element 3 is 1.50-21% larger than the diameter of the smallest circle enveloping the optical fibers 2 defined therein.

Between the inner diameter of the retaining element 3 and the maximum transversal size of the bundle of optical fibers 2, an interspace having an average thickness of 0.1 mm is defined, which interspace is conveniently water-blocked by the filling compound 4.

Figure 2:
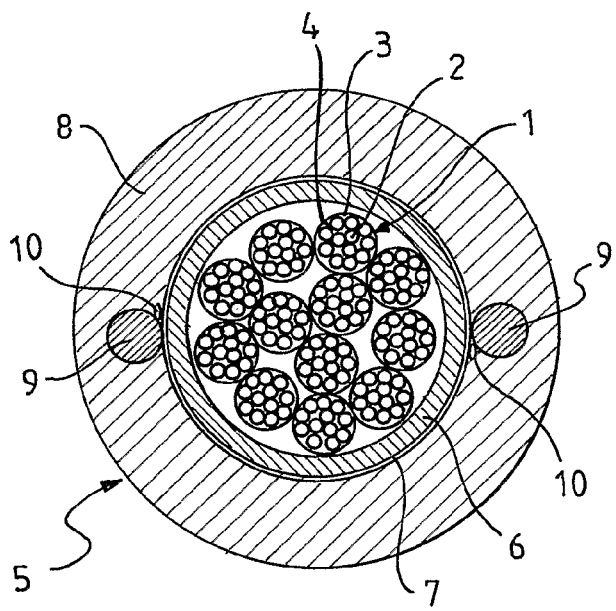
FIG. 2 is a cross-sectional view of a first type of an optical cable for communication comprising a plurality of micromodules of FIG. 1.
Figure 3:
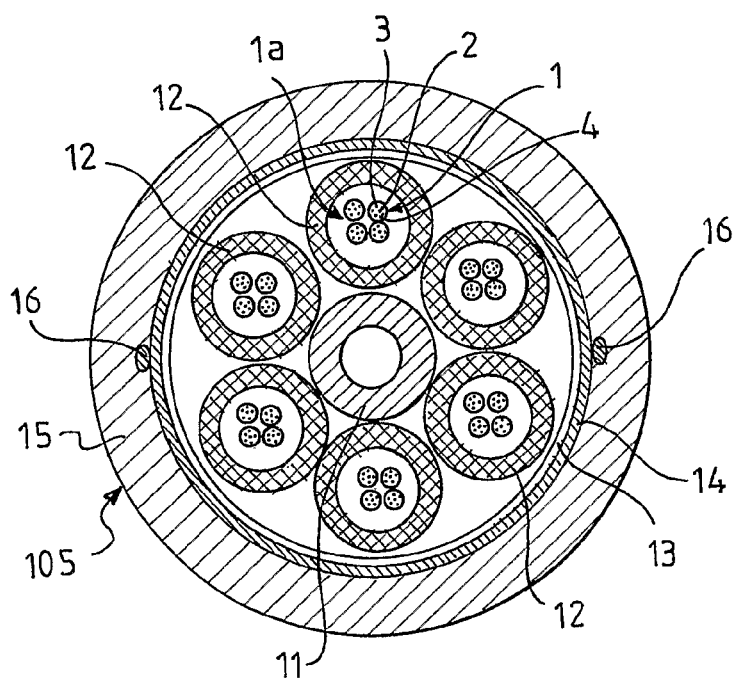
FIG. 3 is a cross-sectional view of a second type of an optical cable for communication comprising a plurality of micromodules of FIG. 1.

With reference to FIGS. 2 and 3, a loose optical cable, in particular a cable 5 of a first type, known in the art with the term of Micromodules in Central Loose Tube (M-CLT), and, respectively, a loose optical cable 105 of a second type, known in the art with the term of Micromodules in Stranded Loose Tubes (M-SLT), are shown.

With reference to FIG. 2, the optical cable 5 comprises, starting from the radially innermost position towards the radially outermost position, a plurality of micromodules 1 as described above stranded according to a helix of the "SZ" type, a protective tube 6, a tape 7, an outer sheath 8 in which two opposite reinforcing longitudinal elements 9 and two opposite rip-cords 10 for cutting the sheath arranged tangentially to the inner diameter of the outer sheath 8 are embedded. Optionally, between the tube 6 and the outer sheath 8 a textile reinforcing armor may be arranged, such as for example an armor made of aramid fibers or of glass fibers. The micromodules 1 stranded according to a helix pattern of the "SZ" type are arranged around the longitudinal axis of the cable 5 in stranding portions having a first stranding direction (S-shaped), which are alternate to stranding portions having a second opposite stranding direction (Z-shaped).

With reference to FIG. 3, the optical cable 105 comprises an outer sheath 15 and a plurality of tubes 12 arranged in a radially outer position with respect to a plurality of the above-mentioned micromodules 1 and in a radially inner position with respect to the outer sheath 15. Therefore, according to the illustrative example shown in FIG. 3, the cable 105 comprises, starting from the radially innermost position towards the radially outermost position, a central reinforcing element 11, six tubes 12 stranded around the central reinforcing element 11, each tube 12 housing four micromodules 1 stranded according to a helix of the "SZ" type, a tape 13, a textile reinforcing armor 14, and an outer sheath 15 in which two opposite rip-cords 16 for cutting the sheath 15 arranged tangentially to the inner diameter of the outer sheath 15 are embedded.

With reference to FIG. 4, a preferred embodiment of a plant for manufacturing the micromodule 1 according to the invention is generally illustrated at 17. In order to manufacture the cable 5 or the cable 105 described above, additional conventional sections for assembling a plurality of micromodules 1 manufactured by means of the plant 17 may be arranged downstream of the plant 17. For example, the sections where the outer sheath is applied, where rip-cords are inserted, where reinforcing elements are inserted and where a wrapping tape is added, may be present downstream of the plant 17. Anyway, it should be understood that all these sections are present in the plant of the present invention or the corresponding steps are carried out separately.

In the preferred embodiment shown in FIG. 4, the plant 17 comprises in particular a device for delivering the optical fibers 2 along a predetermined conveying direction, such as for example a pay-off stand 18 including a plurality of spools 19 intended to deliver a respective plurality of optical fibers 2 along a predetermined conveying direction. Downstream of the pay-off stand 18, the plant 17 further comprises a stationary distributor plate 20 in which a plurality of guiding holes is defined, which plate 20 is intended to maintain the optical fibers 2 supplied by the spools 19 reciprocally spaced and parallel to a predetermined conveying direction, indicated with A in FIG. 4.

Downstream of the distributor plate 20, the plant 17 further comprises a device for stranding the optical fibers 2, such as for example a stranding plate 21 intended to strand the optical fibers 2 according to a helix of the "SZ" type.

For such a purpose, the stranding plate 21 is arranged in such a manner as to rotate alternatively clockwise and counterclockwise around a rotation axis substantially parallel to the above-mentioned conveying direction A of the optical fibers 2. In other words, the stranding plate 21 is oscillating around such a rotation axis. Furthermore, a plurality of guiding holes corresponding to the guiding holes of the distributor plate 20 is defined in the stranding plate 21.

According to the invention, the plant 17 comprises an apparatus for embedding the optical fibers 2 in a mass of the filling compound 4. In such a manner, the optical fibers 2 are homogeneously surrounded by a layer of filling compound 4 and all the interspaces between the optical fibers 2 are advantageously filled. Said apparatus is arranged downstream of the stranding plate 21 and comprises a chamber 22 containing the filling compound 4.

The chamber 22 is provided with an inlet opening 27a and an outlet opening 27b arranged at opposite sides for the inlet of the stranded optical fibers 2 and, respectively, for the outlet of the same optical fibers 2 suitably embedded in the filling compound 4.

The inlet opening 27a is shaped as a cylindrical hole having a larger diameter with respect to the overall theoretical diameter of the plurality optical fibers 2: this geometry has been designed in order not to interfere with the arrangement of the plurality of optical fibers 2 in the chamber 22 and to facilitate the application of the filling compound 4 around the plurality of optical fibers 2 as well as in the interspaces between the optical fibers 2.

The outlet opening 27b is shaped so as to impart a predetermined form to the filling compound 4 embedding the optical fibers 2. In other words, the outlet opening 27b is shaped in such a manner as to obtain an outer coating layer of filling compound 4 having a predetermined geometric profile. Furthermore, the outlet opening 27b has a suitable size so as to take away from the plurality of optical fibers 2 the filling compound 4 exceeding a predetermined amount and so as to obtain an outer coating layer of filling compound 4 having a predetermined thickness.

As an illustrative example, the outlet opening 27b has a substantially circular shape, so as to impart a substantially cylindrical shape to the filling compound 4 embedding the plurality of optical fibers 2.

The temperature of the filling compound 4 contained in the chamber 22 is conveniently controlled, for example by means of an electric thermoregulating device, not shown, intended to maintain the filling compound 4 at a predetermined temperature, preferably of 100° C.

The chamber 22 is in fluid communication with a reservoir 24 of filling compound 4 through a channel 23 for supplying the filling compound 4.

The plant 17 further comprises, downstream of the above-mentioned chamber 22, an apparatus 26 for extruding the retaining element 3 around the above-mentioned plurality of optical fibers 2 embedded in the filling compound 4, so as to form a micromodule 1 blocked with respect to the propagation of water. The extrusion apparatus 26 includes an extrusion cross-head 25 intended to be fed with a suitable thermoplastic material used to form the retaining element 3 by means of an extrusion screw not shown in FIG. 4, which is housed in said extrusion apparatus 26. As better shown in FIG. 5, the extrusion cross-head 25 comprises a tip 25a and a die 25b coaxially mounted together so as to form an extrusion channel 25c in which the thermoplastic polymeric composition intended to form the retaining element 3 of the micromodule 1 is extruded. Preferably, the common axis around which the tip 25a and the die 25b are mounted is substantially parallel to the above-mentioned conveying direction A.

In order to cool the retaining element 3 coming out from the extrusion cross-head 25, downstream of the latter a cooling through 28 containing a cooling liquid, such as for example water, is conveniently arranged, the cooling liquid being maintained at a temperature of 20° C.

In the preferred embodiment shown in FIG. 4, downstream of the cooling through 28, a pulling capstan 29 and a take-up device 30 including a tension control device 31, such as a "dancer", and a collection spool 32 intended to collect the micromodule 1 are further arranged.

With reference to the plant 17 described above, in a preferred embodiment thereof, the method of the invention for manufacturing the above-mentioned micromodule 1 comprises the following steps.

In a first step, the above-mentioned plurality of optical fibers 2 is delivered by means of the spools 19 of the pay-off stand 18 along a predetermined direction, in the embodiment shown in FIG. 4 towards the distributor plate 20. Once the optical fibers 2 are conveniently reciprocally spaced and maintained parallel to the conveying direction A by the distributor plate 20, the optical fibers 2 are stranded together according to the "SZ" technique by means of the stranding plate 21.

In a subsequent step the optical fibers 2 are embedded in the mass of filling compound 4 contained in the chamber 22, thus providing the filling compound 4 both around the optical fibers 2 and in the interspaces between the optical fibers 2. For such a purpose, the optical fibers 2 are firstly introduced into the chamber 22 through the inlet opening 27a. The bundle of optical fibers 2 is immersed in the filling compound 4 and then introduced through the outlet opening 27b of the chamber 22, which conveniently allows to take away from the bundle of optical fibers 2 the excessive filling compound 4 and to obtain a bundle of optical fibers 12 incorporated in a mass of filling compound 4 having a substantially cylindrical shape.

In a subsequent step, the retaining element 3 is extruded around the bundle of optical fibers 2 so embedded in the filling compound 4 by means of the extrusion cross-head 25 fed with the desired thermoplastic polymeric composition by means of the above-mentioned extrusion screw housed in the extrusion apparatus 26. In such a way, thanks to the fact that the stranded bundle of optical fibers 2 housed within the retaining element 3 are conveniently embedded in the filling compound 4, downstream of the extrusion cross-head 25a suitably water-blocked micromodule 1 is advantageously produced.

The retaining element 3 so extruded is then cooled by causing it to pass along the cooling through 28, wherein cooling water is flown.

Subsequently, the micromodule 1 is pulled by the pulling capstan 29 and taken up around the final spool 32 after a passage around the tension control device 31 of the take-up system 30.

All the above-mentioned steps are conveniently carried out in a substantially continuous manner, without any intermediate storage step of the semi-finished products between a given step and the successive step.

In such a way, it is conveniently possible to produce the micromodules 1 at a production rate comprised between 50 and 150 m/min: in case the retaining element 3 is extruded by means of a 30 mm extruder 26, the micromodules 1 may be produced at a speed of 50 m/min.

In order to manufacture the cable 5 or the cable 105 described above, additional conventional steps for assembling a plurality of micromodules 1 obtained by means of such method may be subsequently provided.

The value of the viscosity of the filling compound at a shear rate of 10 s$^{-1}$ and at a temperature of 100° C. was determined as follow. The filling compound was submitted to rheological measurements by means of a stress control rheometer Bohlin CVO 120 with a cone-and-plate 2°/40 mm measuring system. More specifically, the rheological measurements consisted of submitting a set of samples of filling compound to a constant shear rate of 10 s$^{-1}$, for 60 s, at a constant temperature of 100° C., and by measuring the viscosity after such 60 s. Before each viscosity measurement, in order to minimize the undesired macroscopic segregation effects, a manual homogenization of the samples was performed and a constant pre-shear rate of 1.5 s$^{-1}$ was applied for 120 s. As reported above, the wettability is defined by means of the cross-over of the curves of the loss modulus G″ and the storage modulus G′.

As is known, the loss modulus G″ is correlated to the viscous properties of the filling compound, which are determined by measuring the phase lag between a predetermined applied shear stress and the resulting measured shear strain.

In oscillation tests, differently from the behavior represented by Hooke's law according to which the strain is correlated to stress via a material constant called elastic modulus, stress and strain are constantly changing and only instantaneous values of the so-called viscoelastic or complex modulus G* may be measured. G* is defined as follows:

$$G^* = G' + iG''$$

wherein

G′ is the storage (or elastic) modulus, i.e. the modulus representing the behavior of an elastic solid, which gives a measure of the elastic storage of energy;

G″ is the loss (or viscous) modulus, i.e. the modulus representing the behavior of a viscous fluid, which gives a measure of the viscous dissipation of energy through a permanent deformation in flow;

i is the imaginary unity of complex numbers.

As is known, G′ and G″ are also related to the phase angle by the following formula:

$$\tan \delta = G''/G'$$

wherein G′ and G″ are defined as above and tan δ is proportional to the energy dissipation due to hysteresis.

The cross-over (CO) value at the intersection between the curves of the loss modulus G″ and the storage modulus G′ was measured by means of the above-mentioned rotational stress control rheometer Bohlin CVO 120, in particular by means of a frequency sweep test performed at 100° C., which consisted in applying a target strain of 0.03 in order to operate in the so-called region of linear strain response, in the range of frequencies starting from 150 Hz to 0.1 Hz. The region of linear strain response was defined by an amplitude sweep test performed at a temperature of 100° C. and at different frequencies: 1 Hz, 10 Hz and 150 Hz. An increasing stress was applied in the range 1-10000 Pa with a delay of time of 2 s.

With reference to the micromodule and to the plant and method for manufacturing the same described above, some examples of water-blocked micromodules intended to be used in the manufacture of optical cables for communication are given below by way of illustrative and non limiting examples.

Example 1

Invention

A filling compound was prepared by mixing silicone oil having a viscosity of 5000 mPa·s at 20° C. (Wacker® AK 5000, available from Wacker-Chemie GmbH, München, Germany) and silica in a ratio of 19/1 by weight. The silica was made of a combination of fumed silica (CAB-O-SIL® H-5 having a B.E.T. surface area of 300 m$^2$/g, available from Cabot Corporation, Boston, Mass.) and of hydrophobic fumed silica treated with dimethyldichlorosilane (e.g. CAB-O-SIL® TS-610) in a ratio of 2/3 by weight.

The viscosity of the filling compound at a shear rate of 10 s$^{-1}$ and at a temperature of 100° C. was measured by means of the above-mentioned rotational stress control rheometer Bohlin CVO 120, by applying a constant shear rate of 10 s$^{-1}$, for 60 s, at a constant temperature of 100° C., and by measuring the viscosity after such 60 s. Before each viscosity measurement, in order to minimize undesired macroscopic segregation effects, a manual homogenization of the samples was performed and a constant pre-shear rate of 1.5 s$^{-1}$ was applied for 120 s.

The obtained result is reported in Table I.

The cross-over (CO) value at the intersection between the curves of the loss modulus G″ and the storage modulus G′ was measured by means of the above-mentioned rotational stress control rheometer Bohlin CVO 120, by means of a frequency sweep test performed at 100° C., which consisted in applying a target strain of 0.03 in order to operate in the so-called region of linear strain response, in the range of frequencies starting from 150 Hz to 0.1 Hz. The region of linear strain response was defined by an amplitude sweep test performed at a temperature of 100° C. and at different frequencies: 1 Hz, 10 Hz and 150 Hz. An increasing stress was applied in the range 1-10000 Pa with a delay of time of 2 s.

The obtained result of the measurement is reported in Table II.

Example 2

Invention

A filling compound was prepared by mixing a silicone oil having a viscosity of 5000 mPa·s at 20° C. (Wacker AK 5000, available from Wacker-Chemie GmbH, München, Germany) and silica in a ratio of 13/1 by weight. The silica was made of a combination of fumed silica (CAB-O-SIL® H-5 having a B.E.T. surface area of 300 m²/g, available from Cabot Corporation, Boston, Mass.) and of hydrophobic fumed silica treated with dimethyldichlorosilane (e.g. CAB-O-SIL® TS-610) in a ratio of 5/2.2 by weight.

The viscosity of the filling compound and the cross-over value were determined as described in Example 1: the obtained results are reported in Table I and in Table II, respectively.

Example 3

Comparative Example

A silicone oil Wacker®AK 6000 having a viscosity of 6000 mPa·s at 20° C. (available from Wacker®-Chemie GmbH, München, Germany) was used as filling compound.

Such filling compound has a Newtonian rheological behavior, whereby its viscosity is independent of the shear rate.

The viscosity of the filling compound was determined as described in Example 1: the obtained result is reported in Table I.

Example 4

Comparative Example

A filling compound was prepared by mixing silicone oil having a viscosity of 5000 mPa·s at 20° C. (Wacker AK 5000, available from Wacker-Chemie GmbH, München, Germany and a silica in a ratio of 9.5/1 by weight. The silica was made of a combination of fumed silica (CAB-O-SIL® H-5 having a B.E.T. surface area of 300 m²/g, available from Cabot Corporation, Boston, Mass.) and of hydrophobic fumed silica treated with dimethyldichlorosilane (e.g. CAB-O-SIL® TS-610) in a ratio of 7.3/2.2 by weight.

The viscosity of the filling compound was determined as described in Example 1: the obtained result is reported in Table I.

Example 5

Comparative Example

A filling compound was prepared by mixing a silicone oil having a viscosity of 4500 mPa·s at 20° C. (Bayer Silopren U 5, available from Bayer AG, Leverkusen, Germany) and silica in a ratio of 6.8/1 by weight. The silica was made of a combination of fumed silica (CAB-O-SIL® H-5 having a B.E.T. surface area of 300 m²/g, available from Cabot Corporation, Boston, Mass.) and of hydrophobic fumed silica treated with dimethyldichlorosilane (e.g. CAB-O-SIL® TS-610) in a ratio of 10.3/2.4 by weight. The obtained filling compound also contains 0.25% by weight of carbon black.

The viscosity of the filling compound was determined as described in Example 1: the obtained result is reported in Table I.

Example 6

Invention

A polyalphaolefin-based oil LA444 available from Hubergruppe was used as a filling compound.

The viscosity of the filling compound and the cross-over value were determined as described in Example 1: the obtained results are reported in Table I and in Table II, respectively.

Example 7

Comparative Example

A hydrocarbon based oil Unigel 200N available from Shennzhen Unigel was used as filling compound.

The viscosity of the filling compound and the cross-over value were determined as described in Example 1: the obtained results are reported in Table I and in Table II, respectively.

TABLE I

| Filling compound | Viscosity measured at 10 s$^{-1}$ and 100° C. (Pa · s) |
| --- | --- |
| Example 1 (invention) | 19 |
| Example 2 (invention) | 23 |
| Example 3 (comparative) | 1.7 |
| Example 4 (comparative) | 32 |
| Example 5 (comparative) | 35 |
| Example 6 (invention) | 6.7 |
| Example 7 (comparative) | 9.5 |

TABLE II

| Filling compound | Cross-over at 100° C. (Hz) |
| --- | --- |
| Example 1 (invention) | <10 |
| Example 2 (invention) | <10 |
| Example 6 (invention) | 23 |
| Example 7 (comparative) | 30 |

Example 8

Test of Application of a Filling Compound in a Micromodule

The seven filling compounds of Example 1-7 were used to block as many micromodules with respect to propagation of water. The micromodules were manufactured, as described above, by embedding in a mass of filling compound a bundle of 12 optical fibers stranded according to the "SZ" technique. For this purpose, the optical fibers were passed in a chamber as described above, which chamber contained the filling compound and was thermoregulated at 100° C. In this manner, the filling compound surrounded the bundle of optical fibers and completely filled all the interspaces between the optical fibers making part of the bundle. A retaining element made of a thermoplastic polymeric composition reported in Table VII (said retaining element having an elastic module of 260 MPa at 20° C., ultimate tensile strength of 7.8 MPa, and elongation at break of 75%) was extruded around the bundle of optical fibers embedded in the filling compound at an extrusion temperature of 140-180° C.

The advancing speed of the optical fibers bundle coated with the filling compound was 50 m/min.

The resulting draw down ratio after the congruence between the optical fibers bundle and the retaining element was 2.1.

The filling compound filled 90% of the volume defined within the retaining element.

The micromodule obtained in this manner was cooled by passing along the cooling through down to a temperature of 20° C.

The results of the application of the filling compounds according to the invention are shown in Table III, where the variation of the maximum dimension of the overall size of the retaining element during the manufacturing process—which was measured downstream of the extrusion apparatus and downstream of the cooling channel, after the completion of the cooling step—proved to be confined within acceptable values.

Furthermore, the retaining element showed a regular cylindrical form.

Resistance tests were also performed according to a modified method F5B, according to which a 1 m water head was applied for 15 days to sample having a length of 1 m.

The results of the tests are shown in Table IV. The results of the tests have been considered positive when no or slight water propagation in the micromodule was detected, in any case a propagation involving a length lower than the length of the sample.

TABLE IV

| Filling compound | Method F5B (standard IEC60794-1-2) head of H$_2$O: 1 m duration: 24 h | | Modified method F5B head of H$_2$O: 1 m sample length: 1 m duration: 15 days |
|---|---|---|---|
| | Sample length: 1 m | Sample length: 3 m | |
| Example 1 (invention) | positive result | positive result | positive result |
| Example 2 (invention) | positive result | positive result | positive result |
| Example 3 (comparative) | negative result | negative result | negative result |
| Example 6 (invention) | positive result | positive result | positive result |
| Example 7 (comparative) | positive result | positive result | positive result |

Furthermore, after being embedded in the filling compound, the optical fibers were visually observed (visual test) in order to evaluate the "wettability". The outcome of the visual tests was considered:

positive if the filling compound was properly applied both around the optical fibers, thus forming an homogeneous coating around the bundle of optical fibers, and in the interspaces between the optical fibers, thus filling completely such interspaces;

negative if the filling compound was not properly applied either around the optical fibers, thus giving rise to a non-homogeneous coating, or in the interspaces between the optical fibers, thus giving rise to an undesired incomplete filling of such interspaces. The obtained result were reported in Table III.

TABLE III

| Filling compound | Variation of the retaining element diameter (mm) | Wettability (visual test) |
|---|---|---|
| Example 1 (invention) | 1.38 ± 0.03 | Positive |
| Example 2 (invention) | 1.38 ± 0.05 | Positive |
| Example 3 (comparative) | 1.38 ± 0.02 | Positive |
| Example 4 (comparative) | Breaking of retaining element was detected | Negative |
| Example 5 (comparative) | Impossible to produce the water-blocked micromodule | Negative |
| Example 6 (invention) | 1.38 ± 0.06 | Positive |
| Example 7 (comparative) | 1.38 ± 0.10 | Negative |

Example 9

Test of Resistance to Water Passage

The filling compounds of Example 1-3, 6 and 7 were tested in order to evaluate the resistance to the propagation of water of the micromodules containing the same. The micromodules were produced as described in Example 8.

Resistance tests according to the method F5B provided for by the International Standard IEC 60794-1-2 were performed. In particular, the resistance to water propagation of the micromodule was tested by applying a 1 m water head for 24 h at an end of a sample micromodule having a length of 1 and 3 m.

Example 10

Drip Test

The filling compounds of Example 1-3, 6 and 7 were tested in order to evaluate their resistance to dripping out from the micromodules. The micromodules were produced as described in Example 8.

Vertical drip tests were performed according to the method E14 provided for by the International Standard IEC 60794-1-2. In particular, samples of micromodules having a length of 30 cm were vertically oriented and submitted to a temperature of 70° C. for 24 h. In a first test, the top free end of the samples was sealed, while in a second test, the top free end was let open.

The results are reported Table V.

TABLE V

| | Drip test at 70° C. for 24 h on a 30 cm sample (% by weight of the dripped filling compound) | |
|---|---|---|
| Filling compound | Sealed top free end | Open top free end |
| Example 1 (invention) | 0.0 | 0.0 |
| Example 2 (invention) | 0.0 | 0.0 |
| Example 3 (comparative) | ~10 ÷ 20 | ~30 ÷ 45 |
| Example 6 (invention) | 0.0 | 0.0 |
| Example 7 (comparative) | ~5 | ~10 |

Example 11

Thermal Cycle Test

The filling compounds of Example 1-3, 6 and 7 were tested in order to evaluate the attenuation of the optical fibers in the micromodules. The micromodules were produced as described in Example 8.

Thermal cycle tests were performed by submitting a sample of the micromodules having 1000 m length to thermal cycles from −40° C. to +60° C.

During the thermal cycles, at the above-mentioned temperatures of −40° C., +20° C. and +60° C., the attenuation was measured at 1550 nm and at 1625 nm. A regular behavior of the optical fibers in the cable was detected, both in terms of attenuation at +20° C. and in terms of variation of attenuation in the range of temperatures tested (−40° C.−+60° C.).

The results are reported in Table VI.

TABLE VI

Measurements of optical attenuation (dB/km)

| Filling compound | 1550 nm | 1625 nm | Test result |
|---|---|---|---|
| Example 1 (invention) | $\alpha_{average}$ (20° C.) = 0.19<br>$\Delta\alpha_{average}$(−40° C. ÷ +60° C.) ≤ +0.02 | $\alpha_{media}$(20° C.) = 0.20<br>$\Delta\alpha_{average}$(−40° C. ÷ +60° C.) ≤ +0.02 | Positive |
| Example 2 (invention) | $\alpha_{media}$ a 20° C. = 0.19<br>$\Delta\alpha_{average}$(−40° C. ÷ +60° C.) ≤ +0.02 | $\alpha_{average}$ (20° C.) = 0.20<br>$\Delta\alpha_{average}$(−40° C. ÷ +60° C.) ≤ +0.03 | Positive |
| Example 3 (comparative) | $\alpha_{average}$(20° C.) = 0.20<br>$\Delta\alpha_{average}$(−40° C. ÷ +60° C.) ≤ +0.02 | $\alpha_{average}$(20° C.) = 0.22<br>$\Delta\alpha_{average}$(−40° C. ÷ +60° C.) ≤ +0.02 | Positive |
| Example 6 (invention) | $\alpha_{average}$(20° C.) = 0.19<br>$\Delta\alpha_{average}$(−40° C. ÷ +60° C.) ≤ +0.05 | $\alpha_{average}$(20° C.) = 0.20<br>$\Delta\alpha_{average}$(−40° C. ÷ +60° C.) ≤ +0.06 | Positive |
| Example 7 (comparative) | $\alpha_{average}$(20° C.) = 0.19<br>$\Delta\alpha_{average}$(−40° C. ÷ +60° C.) ≤ +0.10 | $\alpha_{average}$(20° C.) = 0.20<br>$\Delta\alpha_{average}$(−40° C. ÷ +60° C.) ≤ +0.15 | Negative |

TABLE VIII

| Compound | Amounts* |
|---|---|
| Lotryl ® 17BA07 | 70 |
| Lotryl ® 30BA02 | 10 |
| Flexirene ® CL10 | 20 |
| Lotader ® 3410 | 6 |
| Rhodorsil ® GUM 901 | 4 |
| Anox ® 20) | 1 |

*the amounts are expressed in phr, i.e. parts by weight per 100 parts of the olefin polymer (a).
Lotryl ® 17BA07 (Atofina): copolymer ethylene-butyl acrylate containing 16% to 19% by weight of acrylic ester;
Lotryl ® 30BA02 (Atofina): copolymer ethylene-butyl acrylate containing 28% to 32% by weight of acrylic ester;
Flexirene ® CL10 (Polimeri Europa): linear low density polyethylene;
Lotader ® 3410 (Atofina): ethylene-n-butylacrylate-maleic anhydride terpolymer;
Hydrofy ® GS1.5 (Sima): magnesium hydroxide coated with stearic acid;
Rhodorsil ® GUM 901 (Rhodia): dimethylsiloxane, methyl vinyl terminated gum;
Dynasylan ® AMEO (Sivento-Chemie): 3-aminopropyl-triethoxysilane;
Anox ® 20 (Great Lakes Chemical): pentaerythrityl-tetrakis-[3-(3,5-di-t-butyl-4-hydroxyphenyl)-propionate] (antioxidant).

The invention claimed is:

1. A method for manufacturing an optical cable for communication comprising at least one micromodule, said micromodule being blocked with respect to the propagation of water, comprising the steps of:
   providing at least one optical fiber;
   embedding said at least one optical fiber in a pseudoplastic filling compound; and
   extruding a retaining element made of a thermoplastic polymeric composition around said at least one optical fiber so embedded in said filling compound to obtain a micromodule,
wherein said filling compound has a viscosity of 3 Pa·s to 30 Pa·s at a shear rate of 10 s$^{-1}$ and at a temperature of 100° C., and a cross-over lower than 30 Hz at a temperature of 100° C.

2. The method for manufacturing an optical cable according to claim 1, wherein said filling compound has a viscosity of 5 Pa·s to 25 Pa·s at a shear rate of 10 s$^{-1}$ and at a temperature of 100° C.

3. The method for manufacturing an optical cable according to claim 1, wherein said filling compound has a cross-over of 5 Hz to 25 Hz at a temperature of 100° C.

4. The method for manufacturing an optical cable according to claim 1, comprising a plurality of said optical fibers.

5. The method for manufacturing an optical cable according to claim 4, further comprising the step of stranding said plurality of optical fibers together.

6. The method for manufacturing an optical cable according to claim 1, further comprising the step of calibrating said filling compound embedding said at least one optical fiber so as to obtain an outer coating layer of filling compound having a predetermined thickness.

7. The method for manufacturing an optical cable according to claim 1, wherein said embedding step is carried out by having said at least one optical fiber pass through a mass of the pseudoplastic filling compound.

8. The method for manufacturing an optical cable according to claim 1, further comprising the step of cooling said retaining element after said extruding step.

9. The method for manufacturing an optical cable according to claim 1, further comprising the step of assembling a plurality of micromodules.

10. The method for manufacturing an optical cable according to claim 1, wherein said filling compound comprises a gel obtained from at least one liquid and from at least one thickening agent.

11. The method for manufacturing an optical cable according to claim 10, wherein said liquid is selected from the group of: polyalphaolefin oils, polyglycol oils, polybutene oils, polyisobutylene oils, polypropene oils, silicone oils, fluorinated oils, or mixtures thereof.

12. The method for manufacturing an optical cable according to claim 10, wherein said thickening agent is selected from the group of: silica, bentonite, polytetrafluoroethylene, or mixtures thereof.

13. The method for manufacturing an optical cable according to claim 10, wherein said thickening agent is a block copolymer, styrene-ethylene-propylene, styrene-ethylene-butylene, styrene-ethylene-butylene-styrene, or mixtures thereof.

14. The method for manufacturing an optical cable according to claim 10, wherein said liquid is a silicone oil.

15. The method for manufacturing an optical cable according to claim 14, wherein said silicone oil has a viscosity of 100 to 13000 mPa·s at 20° C.

16. The method for manufacturing an optical cable according to claim 12, wherein said thickening agent is a mixture of fumed silica and of an at least partially silanized silica.

17. The method for manufacturing an optical cable according claim 12, wherein the ratio by weight between the liquid and the thickening agent is 20/1 to 10/1.

18. The method for manufacturing an optical cable according to claim 1, wherein said retaining element has a thickness of 0.05 to 0.2 mm.

19. The method for manufacturing an optical cable according to claim 18, wherein said retaining element has a thickness of 0.1 to 0.2 mm.

20. The method for manufacturing an optical cable according to claim 1, wherein said thermoplastic polymeric composition comprises:

(a) at least one first olefin polymer; and
(b) at least one inorganic filler.

21. The method for manufacturing an optical cable according to claim 20, wherein said thermoplastic polymeric composition further comprises at least one second olefin polymer (c) selected from:
   ($c_1$) terpolymers of at least one α-olefin, at least one acrylic acid ester, and at least one α,β-olefinically unsaturated dicarboxylic acid reagent or its derivatives, anhydrides, metal salts, imides, esters, or at least one glycidyl acrylate;
   ($c_2$) terpolymers of ethylene, at least one α,β-olefinically unsaturated dicarboxylic acid anhydride, and at least one vinyl ester of a saturated carboxylic acid; and
   ($C_3$) olefin polymers grafted with at least one ethylenically unsaturated monomer.

22. The method for manufacturing an optical cable according to claim 21, wherein said second olefin polymer (c) is present in the thermoplastic polymeric composition in an amount of 3 parts by weight to 10 parts by weight with respect to 100 parts by weight of the first olefin polymer (a).

23. The method for manufacturing an optical cable according to claim 20, wherein said first olefin polymer (a) is selected from: low density polyethylene, linear low density polyethylene, ultra low density polyethylene; atactic polypropylene, high and low density poly-1-butene, poly-4-methyl-1-pentene, ultra-low-molecular weight polyethylene, ethylene-based ionomers, poly-4-methyl-1-pentene, ethylene propylene copolymers, ethylene-propylene-diene copolymers, copolymer of ethylene and/or propylene with other copolymerizable monomers, ethylene-1-butylene copolymer, ethylene-vinyl acetate copolymer, ethylene-methyl acrylate copolymer, ethylene-butyl acrylate copolymer, ethylene-ethyl acetate copolymer, propylene-4-methyl-1-pentene copolymer, ethylene-vinyl alcohol copolymer, ethylene acrylic elastomers, ethylene-methyl acrylate-acrylic acid terpolymers, or mixtures thereof.

24. The method for manufacturing an optical cable according to claim 20, wherein said inorganic filler (b) is selected from: hydroxides, hydrated oxides, salts or hydrated salts of metals.

25. The method for manufacturing an optical cable according to claim 24, wherein the metals comprise calcium, magnesium, aluminum, or mixtures thereof.

26. The method for manufacturing an optical cable according to claim 20, wherein said thermoplastic polymeric composition has an elastic module lower than or equal to 500 MPa at a temperature of 20° C.

27. The method for manufacturing an optical cable according to claim 20, wherein said thermoplastic polymeric composition has an ultimate tensile strength lower than or equal to 12 MPa.

28. The method for manufacturing an optical cable according to claim 20, wherein said thermoplastic polymeric composition has an elongation at break lower than or equal to 100%.

29. A plant for manufacturing an optical cable for communication comprising at least one micromodule, said micromodule being blocked with respect to the propagation of water, comprising:
   an apparatus for embedding said at least one optical fiber in a pseudoplastic filling compound; and
   an apparatus for extruding a retaining element made of a thermoplastic polymeric composition around said at least one optical fiber so embedded in said filling compound to obtain a micromodule.

30. The plant according to claim 29, wherein said apparatus for embedding said at least one optical fiber comprises a chamber containing said pseudoplastic filling compound.

31. The plant according to claim 30, wherein said chamber is provided with an inlet opening and an outlet opening arranged at opposite sides for the inlet of the at least one optical fiber to be embedded in the filling compound and, respectively, for outlet of the at least one optical fiber embedded in the filling compound.

32. The plant according to claim 31, further comprising a device for feeding said at least one optical fiber to said inlet opening of the chamber along a predetermined conveying direction.

33. The plant according to claim 30, further comprising a plate for stranding a plurality of said optical fibers arranged upstream of said chamber.

34. The plant according to claim 30, further comprising a cooling through for cooling said retaining element arranged downstream of said extrusion apparatus.

35. An optical cable for communication, comprising at least one micromodule blocked with respect to the propagation of water, wherein said micromodule comprises:
   at least one optical fiber;
   a retaining element for housing said at least one optical fiber; and
   a pseudoplastic filling compound having a viscosity of 3 Pa·s to 30 Pa·s at a shear rate of $10 \text{ s}^{-1}$ and at a temperature of 100° C. and a cross-over lower than 30 Hz at a temperature of 100° C.

36. The optical cable according to claim 35, wherein said viscosity is 5 Pa·s to 25 Pa·s at a shear rate of $10 \text{ s}^{-1}$ and at a temperature of 100° C.

37. The optical cable according to claim 35 wherein said cross-over is 5 Hz to 25 Hz at a temperature of 100° C.

38. The optical cable according to claim 35, wherein said filling compound fills at least 85% of the volume defined within said retaining element.

39. The optical cable according to claim 37, wherein said filling compound fills at least 90% of the volume defined within said retaining element.

40. The optical cable according to claim 35, wherein said filling compound comprises a gel obtained from at least one liquid and from at least one thickening agent.

41. The optical cable according to claim 35, wherein said retaining element has a thickness of 0.05 to 0.2 mm.

42. The optical cable according to claim 35, wherein said retaining element comprises a thermoplastic polymeric composition comprising:
   (a) at least one first olefin polymer; and
   (b) at least one inorganic filler.

43. The optical cable according to claim 35, wherein said at least one optical fiber is housed in a loose manner within said retaining element.

44. The optical cable according to claim 35, further comprising at least one outer sheath arranged in a radially outer position with respect to a plurality of said micromodules.

45. The optical cable according to claim 44, further comprising at least one reinforcing element longitudinally embedded in said outer sheath.

46. The optical cable according to claim 45, further comprising a plurality of tubes arranged in a radially outer position with respect to a plurality of said micromodules and in a radially inner position with respect to said at least one outer sheath.

47. The optical cable according to claim 46, further comprising a central reinforcing element longitudinally extending in a central radially inner position with respect to said outer sheath, said plurality of tubes being stranded around said central reinforcing element.

48. A micromodule blocked with respect to the longitudinal penetration of water comprising:
- at least one optical fiber;
- a retaining element for housing said at least one optical fiber; and
- a pseudoplastic filling compound having a viscosity of 3 Pa·s to 30 Pa·s at a shear rate of $10\ s^{-1}$ and at a temperature of 100° C., and a cross-over lower than 30 Hz at a temperature of 100° C.

49. The micromodule according to claim 48, wherein said filling compound comprises a gel obtained from at least one liquid and from at least one thickening agent.

50. The micromodule according to claim 48, wherein said retaining element has a thickness of 0.05 to 0.2 mm.

51. The micromodule according to claim 48, wherein said retaining element comprises a thermoplastic polymeric composition comprising:
- (a) at least one first olefin polymer; and
- (b) at least one organic filler.

* * * * *